2 Sheets—Sheet 1.

H. S. RICHARDS.

BUFFER BRAKE FOR RAILWAY CARS.

No. 11,026. Reissued Aug. 20, 1889.

WITNESSES

C. J. Dwight.

Ed. A. Kelly.

Howard S. Richards

INVENTOR

Attorney

N. PETERS, Photo-Lithographer, Washington, D. C.

2 Sheets—Sheet 2.

H. S. RICHARDS.

BUFFER BRAKE FOR RAILWAY CARS.

No. 11,026. Reissued Aug. 20, 1889.

WITNESSES

C. J. Dwight.

E. A. Kelby.

Howard S. Richards

INVENTOR

Attorney

N. PETERS, Photo-Lithographer, Washington, D. C.

UNITED STATES PATENT OFFICE.

HOWARD S. RICHARDS, OF HATFIELD, PENNSYLVANIA.

BUFFER-BRAKE FOR RAILWAY-CARS.

SPECIFICATION forming part of Reissued Letters Patent No. 11,026, dated August 20, 1889.

Original No. 369,814, dated September 13, 1887. Application for reissue filed June 22, 1889. Serial No. 315,278.

*To all whom it may concern:*

Be it known that I, HOWARD S. RICHARDS, of Hatfield, in the county of Montgomery and State of Pennsylvania, have invented certain new and useful Improvements in Buffer-Brakes for Railway-Cars; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention relates to improvements in "automatic momentum-brakes." Such brakes have heretofore been employed, in which the pushing of the draw-bars resulting from the slowing up of the train has been made to operate the brakes.

The object of my invention is to effect this in a novel and satisfactory manner and to permit the car or train to be backed without the brakes being applied, though again adapted to be operated automatically as soon as the direction of motion has been reversed to a forward movement.

The features of my invention consist in the peculiar arrangement of the combined buffer and draw-bar, the buffer and draw-spring, and the brake-rigging, and in the mechanism employed to throw said rigging out of gear when the train or car is to be backed by the reversal of the direction of the rotation of the car-axles. They are more fully set forth hereinafter, and specified in the claims.

Figure 1:
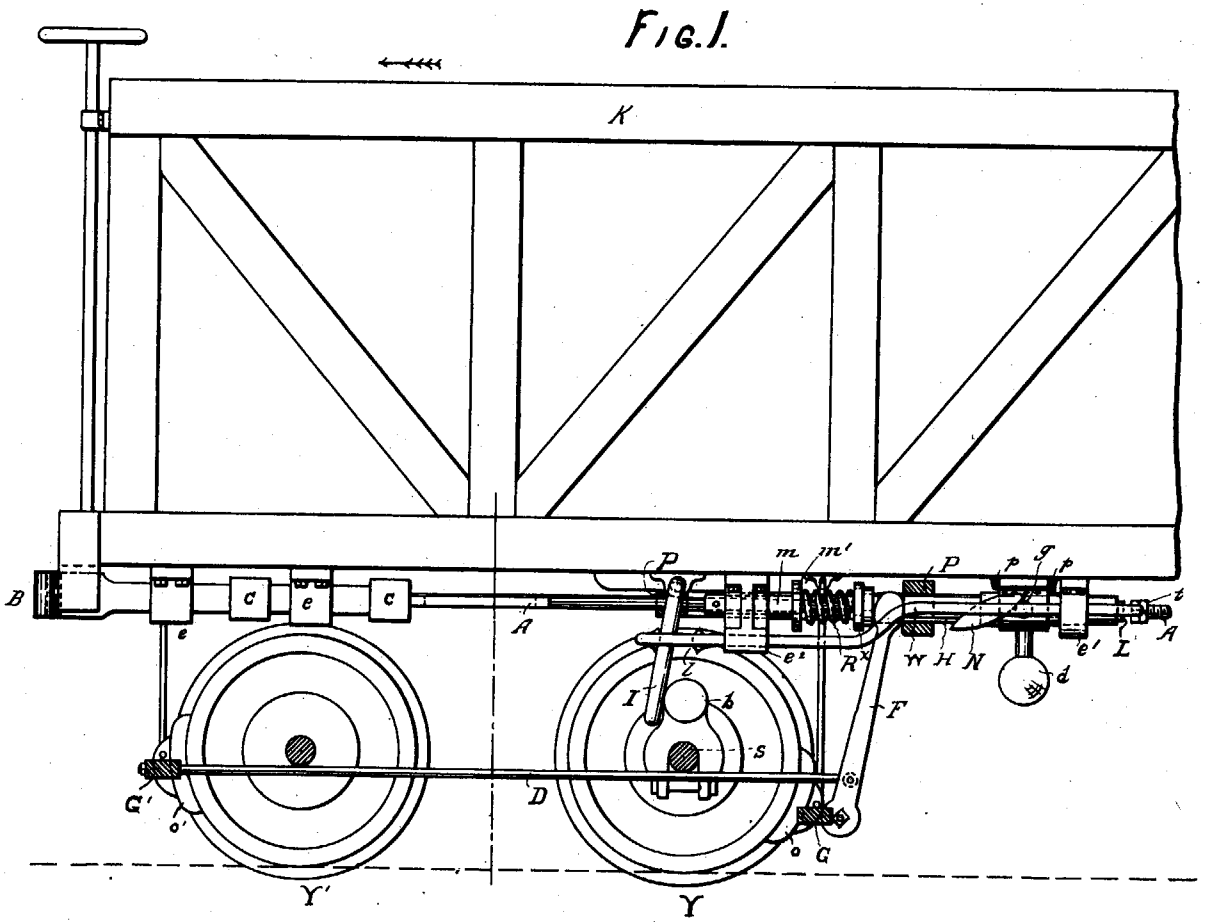
Figure 2:
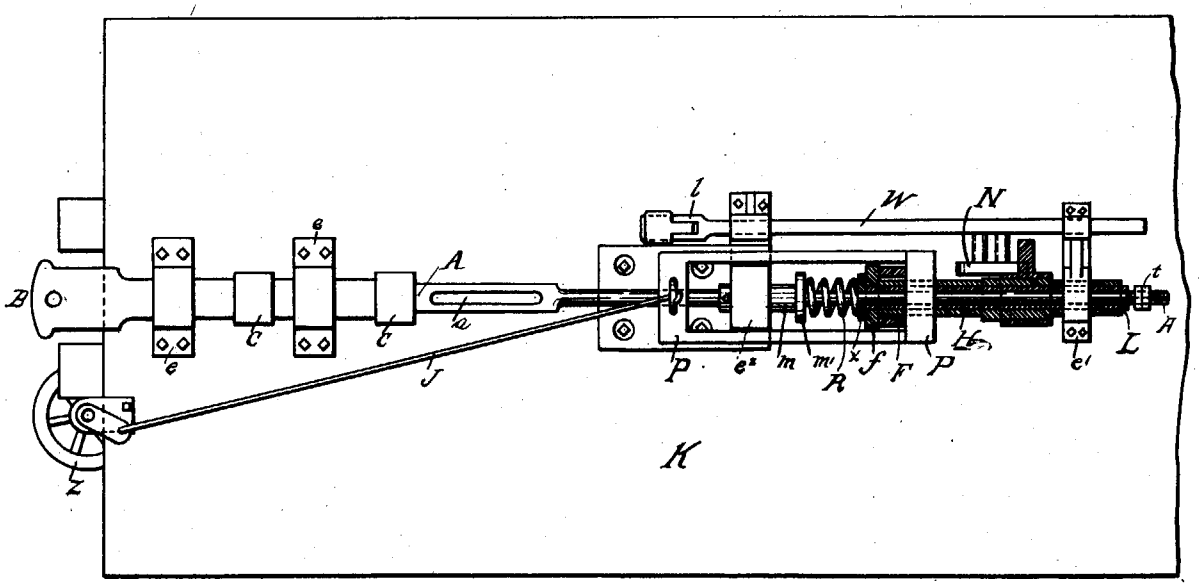
Figure 3:
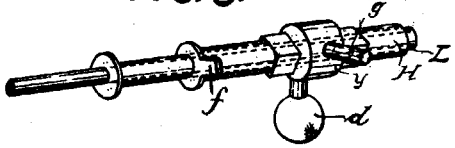

Figure 1 is a side elevation, partly in section, of a car with my brake apparatus attached. Fig. 2 is a bottom view of same, showing a portion of the brake mechanism in section. Fig. 3 is a perspective view of the sleeve arrangement, showing the weighted device for throwing the brake automatically out of gear.

The draw-head B is connected with the bar A, by which the pressure brought upon the head when the latter serves as a buffer is applied through the lever F to the brake-rigring. This bar A is movably secured to the bottom of the car by means of hangers $e$, $e'$, and $e^2$, and is slotted at $a$ to clear the truck-pin. It is provided with fixed shoulders $c$ $c$, which limit its movement by being brought to bear against the hangers $e$.

The lever F is pivoted to the brake-beam G and also to the connecting-rod D, which runs to the other brake-beam G′, in the usual manner, and its upper end is bifurcated and spans a sleeve H, which is strung upon another sleeve L, smaller but somewhat longer, which latter sleeve is strung upon the round inner end of the bar A. Lugs $f$ form an elliptical head on the sleeve H at the end toward the buffer. The sleeves H and L pass through one end of the hollow frame P, the lugs $f$ being inside the hollow part. A spring R is provided on the bar A between loose collars $m'$ and $x$, the former of which is shown as resting against the shoulder $m$, which is fixedly attached to the bar A and passes through the hanger $e^2$, while the collar $x$ presses against the inner sleeve L, which is pushed back when the head B is used as a buffer, thus permitting the collar $x$ to press against the elliptical head $f$ of the outer sleeve H. The forked end of lever F spans the sleeve H immediately back of the elliptical head $f$, which, when the ellipse is crosswise and the bar A is driven back, forces the upper end of the lever back, together with the movably-secured frame P, the force being applied through the medium of the spring R. The bar A projects through the inner sleeve L, and is provided with a nut $t$ to regulate the position of said sleeve and the outer one H, which is carried upon it, the draft upon the spring R being conveyed through the sleeve L to the nut $t$ on the end of the bar.

The mechanism for throwing the brake out of gear is as follows: A crank $b$ is secured to an axle S, in a line with a lever I, which is pivoted at the bottom of the car. A rod W, supported by the extended hangers $e'$ $e^2$, is engaged by the lever I, which passes loosely through its slotted end $l$, and as the said lever is thrown backward or forward by the crank $b$, according to the direction of motion of the car, the rod W is moved also. Near the other end of said rod is secured a cam-plate N, which bears upon an arm $g$, projecting from a third sleeve $y$, which surrounds the sleeve H. The latter has a longitudinal movement in the sleeve $y$, but is compelled to turn with it as the longitudinal movement of the cam in either direction turns the sleeve $y$, which is fixed longitudinally between stops $p$ on the car-frame, and which is also provided with a weighted arm *d*.

Attached to the frame P is a rod *j*, connected with a hand-wheel *z*, designed to be used when it is desired to operate the brakes by hand.

When the car K is moving in the direction indicated by the arrow, and it is desired to slacken the speed or stop the train, immediately upon the slowing up of the engine or forward car the bar A and draw-head B, serving also as a buffer, are driven back either partially or until the shoulder *c* comes in contact with hanger *e*. When the bar A is thus driven back, the shoulder *m*, being firmly affixed to it, passing through the hanger $e^2$, drives the washer *m'* against the spring R, which in turn drives back sleeves L and H, and also the upper end of lever F, when the elliptical head *f* stands in its normal position—that is, crosswise of the car. This backward movement of the lever F, acting in the usual manner, through the connecting-rod *j*, upon brake-beams G and G', presses the brake-shoes *o* and *o'* against the wheels Y and Y', thus retarding their movement and slowing up, and, if desired, eventually stopping the train. A slight forward movement of the engine will draw out the bars A and release the brakes.

If it is necessary to back the train, all that is required is to reverse the engine, as usual. The first backward movement of the wheels Y Y' tends to push in the bar A and apply the brakes, but before the first backward turn of the wheel Y is completed the crank *b* comes in contact with the opposite side of the lever I, which falls toward a vertical position in the slot *l* of the rod W, when not resting upon the crank *b*, and pushes said lever, and with it the rod W, inward. The cam N, engaging the projecting arm *g* of the sleeve *y*, turns the latter, and with it the sleeve H, until the elliptical head *f* is made to stand vertically, when the lever F is released from said head and is free to fall toward the draw-head, the forked end of the lever spanning the smaller diameter of the elliptical head *f*. The brake is thus retained out of gear until the train has been backed as far as desired. Immediately on reversing the engine again to forward movement the head *f* is pulled forward clear of the forked lever, and is free to be turned to its crosswise position by the falling of the weight *d* to its normal vertical position. As the crank *b* strikes the lever I in its reverse movement, the sleeve H is again turned by the passing of the cam N, but, being now pulled forward instead of pushed inward, is immediately restored to its crosswise position by the falling of the weight *d* after the cam has passed, and the apparatus is again ready either to automatically apply the brakes for slowing up the train or to be automatically thrown out of gear to permit backing the same.

When the brakes are applied, it will be noticed that the great increase of pressure upon the wheels, caused by irregularities of the road-bed with ordinary brake arrangements, is entirely avoided, all pressure being applied through the medium of the spring R, thus preventing the wearing of flat places on the wheels, consequent on the application of too much braking-pressure. The inner sleeve L merely serves to take the pressure of the spring R, thus relieving the sleeve H from end pressure when the spring is used as a draw-spring, and permitting it to be readily turned by the falling of the weight *d*.

The frame P, in connection with the brake-wheel *z*, permits the brake to be taken off by hand, if desired, but is evidently not essential to the automatic action upon the brake-lever F, and may be dispensed with, if preferred. It is also evident that the construction and arrangement of parts may be considerably modified without departing from the spirit of my invention, and I do not, therefore, limit myself to the exact mechanism described; but

What I claim is—

1. The combination, with the brake-beams and the buffer-rod provided with a buffer-spring, arranged substantially as described, of a lever connected with said brake-beams and operated by the pushing movement of said buffer-rod through the medium of said spring, substantially as set forth.

2. The combination, with the brake-beams and the buffer-rod provided with a buffer-spring arranged to serve also as a draw-spring, substantially as described, of a lever connected with said brake-beams and operated by the pushing movement of said buffer-rod through the medium of said spring and released by the draw upon the same, all substantially as set forth.

3. The combination, with the brake-beams and the buffer-rod provided with a spring, and a sleeve H, having elliptical head *f*, of a lever connected with said brake-beams and having a bifurcated end engaging said sleeve, substantially as described, and means for turning said sleeve, all arranged and adapted to operate substantially as and for the purpose set forth.

4. The combination, with the brake-beams, the buffer-rod with spring and sleeve H, substantially as described, and lever F, connecting said rod and brake-beams, of a mechanism for automatically turning said sleeve, consisting of a rod W, arranged parallel with said buffer-rod and provided with means, as cam N, engaging an arm *g*, for turning said sleeve, lever I, and axle-crank *b*, all substantially as and for the purpose set forth.

5. In a car, the combination, with a brake-rigging operated by a buffer-rod, and a mechanism for throwing said brake-rigging out of gear, all substantially as described, of a rod W, lever I, and axle-crank *b*, all arranged to automatically operate said mechanism, substantially as set forth.

6. In a car, the draw-bar provided with spring R, sleeve L, sleeve H, with elliptical head, shoulder *m*, and weighted sleeve *y*, with arm *g*, in combination with the brake-beams and connections, lever F, rod W, lever I, and axle-crank *b*, all arranged and adapted to operate substantially as set forth.

7. In a car, the combination, with the draw-bar A and spring R, of the brake-beams and connections, the lever F, and frame P, connected with hand-wheel *z*, all substantially as set forth.

In testimony whereof I affix my signature in presence of two witnesses.

HOWARD S. RICHARDS.

Witnesses:
GRANT MYERS,
J. WILSON IRWIN.